United States Patent
Allwright et al.

[15] 3,647,169
[45] Mar. 7, 1972

[54] AIRCRAFT DOORS
[72] Inventors: Eric Sydney Allwright, Leatherhead; Roy Charles Godwin, Ringwood, both of England
[73] Assignee: British Aircraft Corporation Limited
[22] Filed: Jan. 27, 1970
[21] Appl. No.: 6,091

[30] Foreign Application Priority Data
Feb. 7, 1969 Great Britain..................6,830/69

[52] U.S. Cl..................................................244/129
[51] Int. Cl.................................................B64c 1/14
[58] Field of Search.......................244/129 D, 137 P; 49/246–249, 255, 256

[56] References Cited

UNITED STATES PATENTS

3,051,280  8/1962  Bergman et al. ............244/129 D X
3,085,297  4/1963  Linderfelt ....................244/129 D X
2,748,855  6/1956  Siems et al. ..................244/129 D X

FOREIGN PATENTS OR APPLICATIONS

637,243  2/1962  Canada............................244/129 D

Primary Examiner—Milton Buchler
Assistant Examiner—Gregory W. O'Connor
Attorney—Sughrue, Rothwell, Mion, Zinn & Macpeak

[57] ABSTRACT

An aircraft door having a main part which is outwardly hinged from the fuselage and which vertically lowers into a closed position in secure engagement therewith. A locking panel lies above the upper horizontal edge of the main door and is connected therewith by operating linkage. When the main door is being lowered into a closed position the panel is carried upwardly and outwardly to fill the space between the upper edge of the main door and the fuselage opening, thereby positively locking the door in a closed position.

10 Claims, 8 Drawing Figures 3,647,169

AIRCRAFT DOORS

BACKGROUND OF THE INVENTION

1. Field of the Invention

This invention concerns aircraft having doors of the type which have to be raised before the door can open, in order to disengage securing means, such as lugs, disposed around the periphery of the door from cooperating securing means, such as catches, disposed around the edges of the door opening.

2. Description of the Prior Art

On present doors of this type the fuselage immediately above the door is relived in such a way that the vertical lifting of the door to disengage the securing means does not interfere with the fuselage. The relief leaves the structure in that area weaker than the rest of the fuselage, and leaves the door with a freedom of movement upwards while the door lies shut. The freedom could give rise to the door bursting open if the aircraft hits a bump when running along the ground prior to takeoff or after landing, or when the aircraft is flying through turbulent air.

SUMMARY OF THE INVENTION

According to this invention in an aircraft having a substantially rectangular door of the type described, the door comprises a main part which carries the securing means, and a panel which lies generally adjacent to the upper horizontal edge of the main part and which is connected to the main part by a linkage which permits the panel to be moved between a first position in which it fits tightly between, and flush with, the main part of the door and the upper edge of the door opening, so as to lock the door in the opening, and a second position in which it lies inwardly of and at least partly below the upper edge of the main part, so as to permit the door to open.

Preferably the linkage comprises two panel-operating levers which pivotally connect at their opposite ends to the panel and to the main part, and a roller carried by either the panel or the main part, moving along a slot in a member carried respectively by either the main part or the panel, and the slot is shaped so that during closing of the door the upper edge of the panel is moved upwards and outwards before the lower edge, there being a recess in the fuselage to receive lugs on the upper edge of the panel, the lower edge of the panel then being forced outwards by the panel operating levers until the panel lies flush with the fuselage.

BRIEF DESCRIPTION OF THE DRAWINGS

One door constructed in accordance with this invention is described below with reference to the accompanying drawings in which:

FIG. 6 is a view similar to FIGS. 4 and 5 but showing the panel in an intermediate position, and being taken as indicate by the arrows VI—VI seen in FIG. 1;

DESCRIPTION OF A PREFERRED EMBODIMENT

Figure 1:
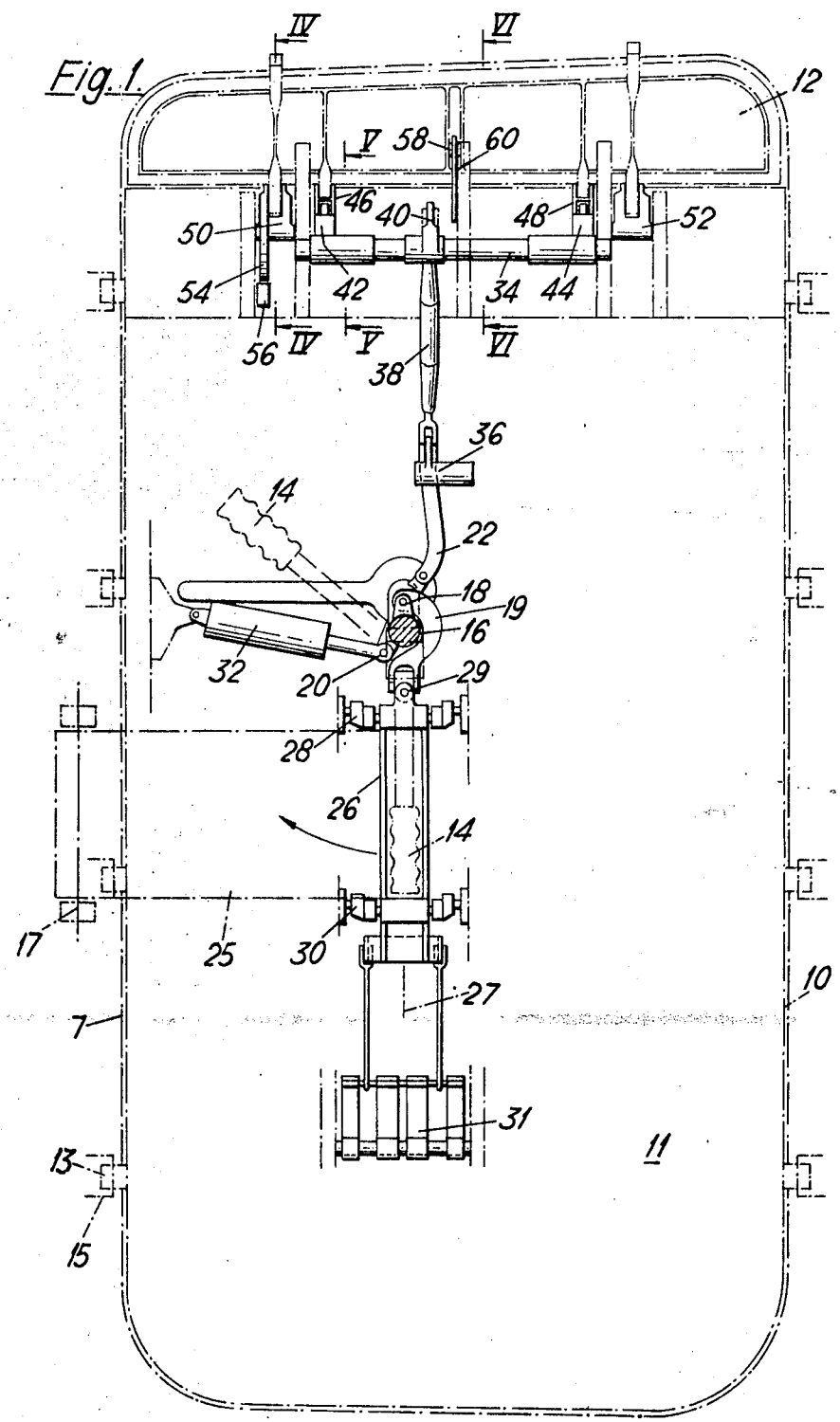
FIG. 1 is a front elevation of the interior surface of the door; the panel and the main part of the door being seen in broken outline.

A fuselage 8 of an aircraft has a substantially rectangular opening 9 to accommodate a door 10. Although the opening and the door are described as substantially rectangular, it is clear that the fuselage can be cylindrical in transverse cross section (see FIG. 2) meaning that the door and opening are curved.

The door 10 carries along the top of its main part 11 a panel 12. The door 10 further carries a handle 14 mounted on a main door shaft 16 projecting from the interior surface of the door. On the shaft 16 are also mounted three levers 18, 20 and 22. The handle 14 and the levers 18, 20 and 22 are all fast with the shaft 16.

Mounted on a hinge arm 25 pivoted to the fuselage at 17 is a bracket 26, being pivotally mounted to rotate on the hinge 25 about a vertical axis 27. The lever 18 connects to the upper part of the bracket 26 through a C-shaped link 19 and a universal coupling 29, and the door is further connected to the bracket 26 by two parallel links 28 and 30 having horizontal axes, which permit the door to move vertically relatively to the bracket. The weight of the door is taken by the hinge 25 through coupling 29 and bracket 26 and a tension spring 31 connected between the bracket 26 and the door. When the handle 14 is raised from its vertical downward position seen in FIG. 1, and turned through about 130° clockwise to the uppermost inclined position seen in FIG. 1, the shaft 16 and lever 18 are turned through the same angle and a force is exerted through link 19 and coupling 29 on the hinge 25, as a result of which the door is lifted with the assistance of the tension spring 31. The movement of the shaft 16, disregarding its rotation, is vertical because the shaft is mounted in the door, which is constrained to move vertically by its engagement with the sides of the fuselage, and further by the links 28 and 30.

The lever 20 connects to a compression spring 32, which moves over a top dead center when passing between two stable end positions. It serves to locate the two end positions of the handle and of the door.

The lever 22 connects to a linkage which extends upwards to the panel 12. The mechanism which operates the panel 12 consists of a torsion shaft 34 which can be rotated by the links 22, 36, and 38 from the main shaft 16, through a link 40. At the ends of the torsion shaft 34 are levers 42 and 44 which operate overcenter toggle linkages 46 and 48 which are attached to the bottom portion of the panel 12. The panel 12 is attached to the door 10 by two panel-operating levers 50 and 52. The lever 50 has an added piece 54 which operates a microswitch 56 connecting to a warning light in a cockpit.

The vertical edges of the door carry projecting lugs 13 which act as the securing means. The side of the opening 7 carry catches 15 which receive the lugs when the main part of the door is lowered in the opening. The catches are the cooperating securing means but the two means could be reversed. The lugs and catches are not shown in detail because they could be of any conventional type.

The way in which the linkages are interconnected to achieve the required relative movements is most easily understood from a description of how the panel 12 moves upwards in consequence of the handle 14 being moved downwards to secure the door after it has been shut. The same downwards movement of the handle simultaneously causes the door to be lowered through rotation of the lever 18 and consequent vertical movement of link 19 which connects the door to its hinges.

Figure 2:
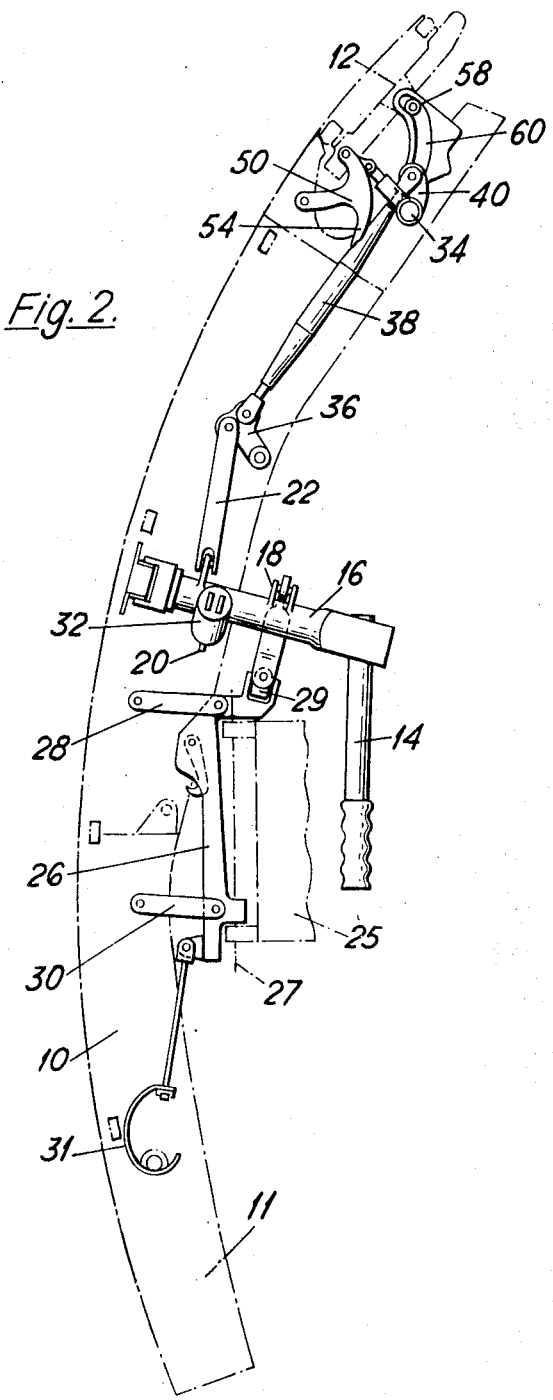
FIG. 2 is a side elevation taken looking from the left of FIG. 1.
Figure 3:
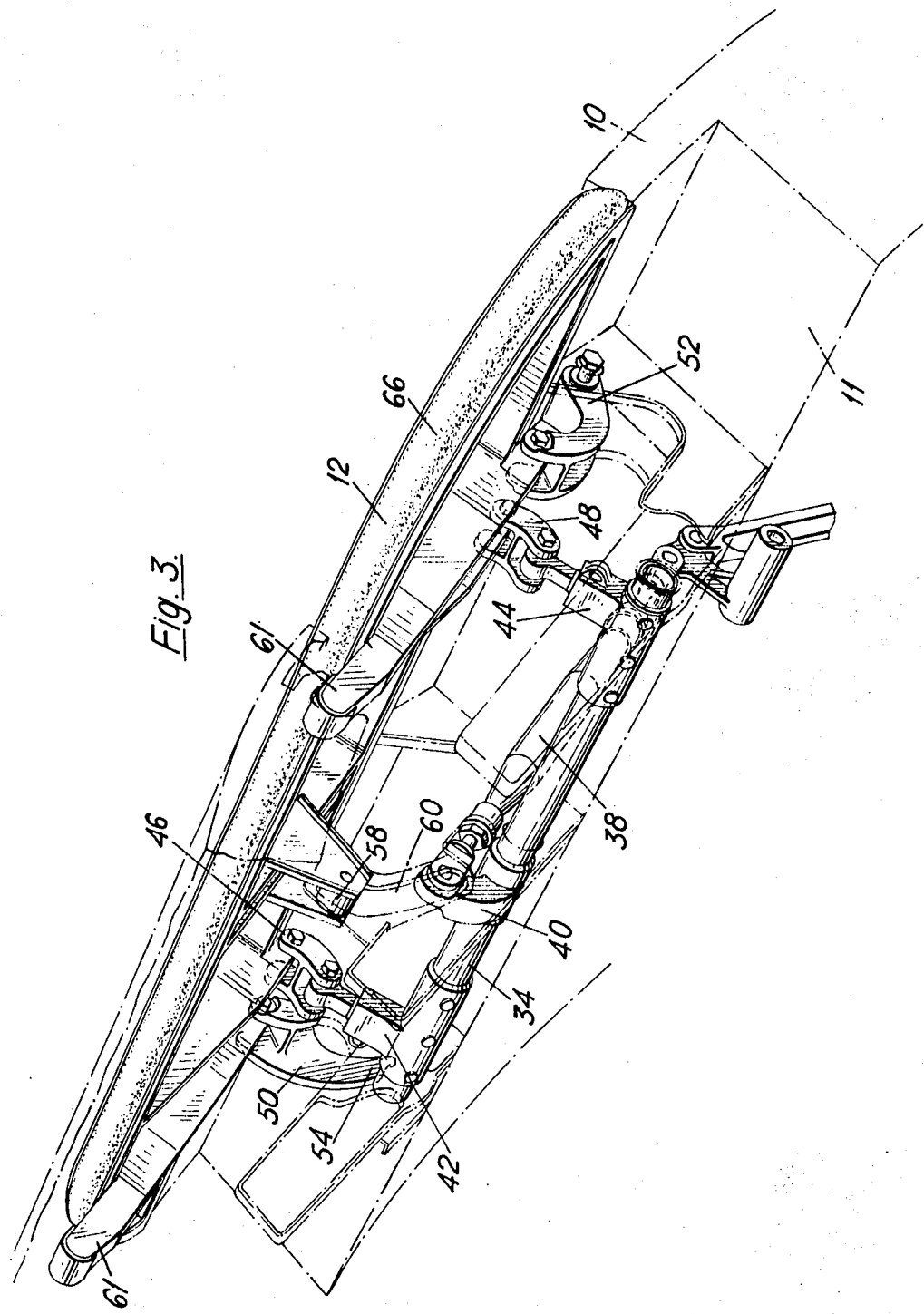
FIG. 3 is a perspective view from above of the panel and the nearby part of a linkage, the two being shown in full line, and the adjacent part of the main part of the door being seen in broken outline.

For ease in the following description, the movement of the door relative to the fuselage is disregarded. We will start from the position in which the door lies within the boundary of the opening in the fuselage with the handle 14 raised, in which position, the door can open outwards as indicated by the arrows 62, seen in FIG. 4. Downward movement of the handle 14 causes the lever 22 to move upwards. The lever 20 moves the spring 32 over top dead center to the position shown in FIG. 1. The upward movement of the lever 22 causes the link 36 to rotate, as best understood from FIG. 2, and the link 38 to move upwards in consequence. There have to be two links 22 and 38 interconnected by the intermediate pivotally mounted link 36 because of the curvature of the door, apparent from FIG. 2. The upward movement of the link 38 causes the shaft 34 to rotate clockwise as seen in FIG. 2, or anticlockwise as seen in FIG. 3, and this causes the levers 42 and 44 (FIGS. 1, 3, and 5) to move to incline upwards.

The precise direction of the movement which is transmitted to the panel 12 by movement of the levers 42 and 44 is directed by a slot 60 on the main part 11 of the door 10 and the upper joints to the lower part of the panel 12. The movement of the lower part of the panel is a simple arcuate movement about the lower axis of the linkage 50 and 52. The slot 60 could alternatively be on the panel 12 and the rollers 58 would then be carried by the main part 11.

Figure 4:
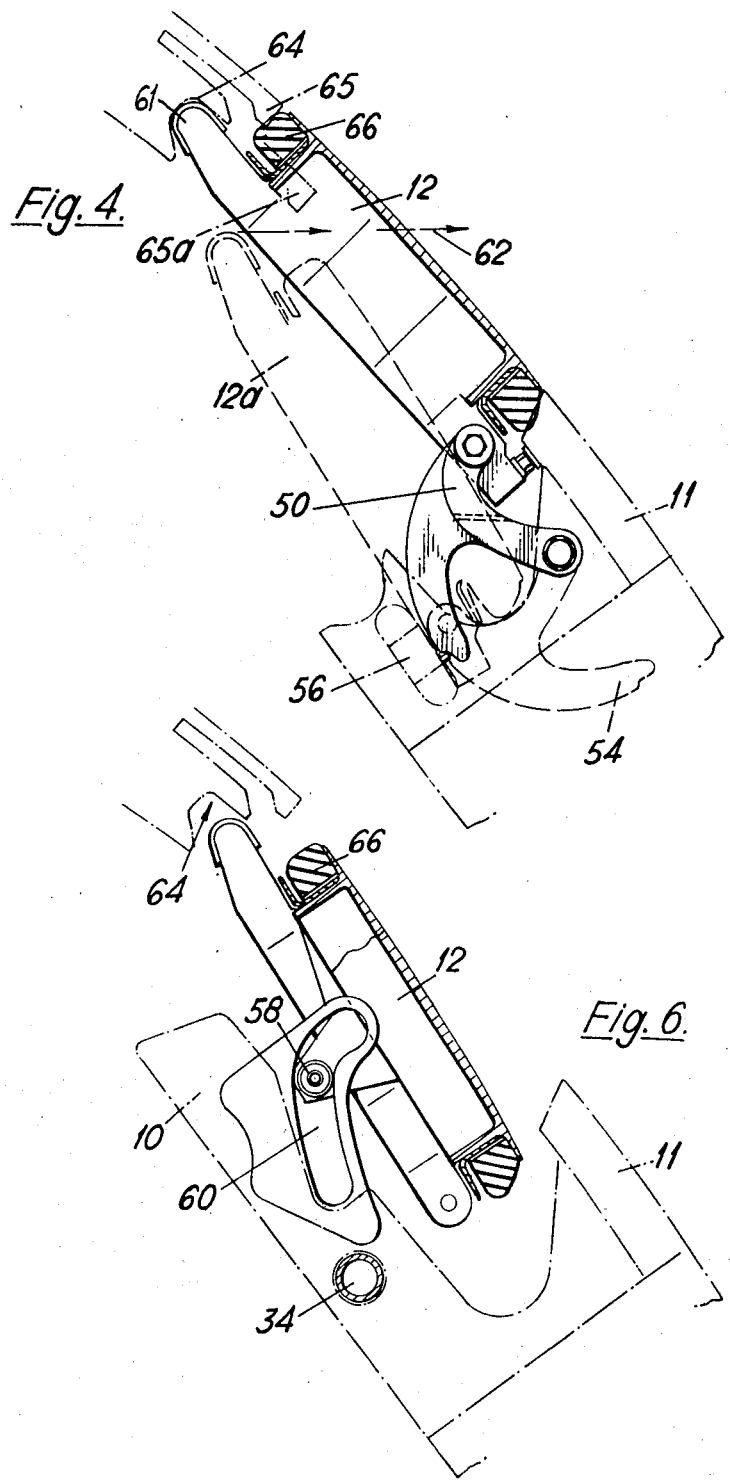
FIG. 4 is a fragmentary sectioned view taken as indicated by the arrows IV—IV seen in FIG. 1, the panel in the fastened position being seen in full line, and in its retracted position in broken line.
Figure 5:
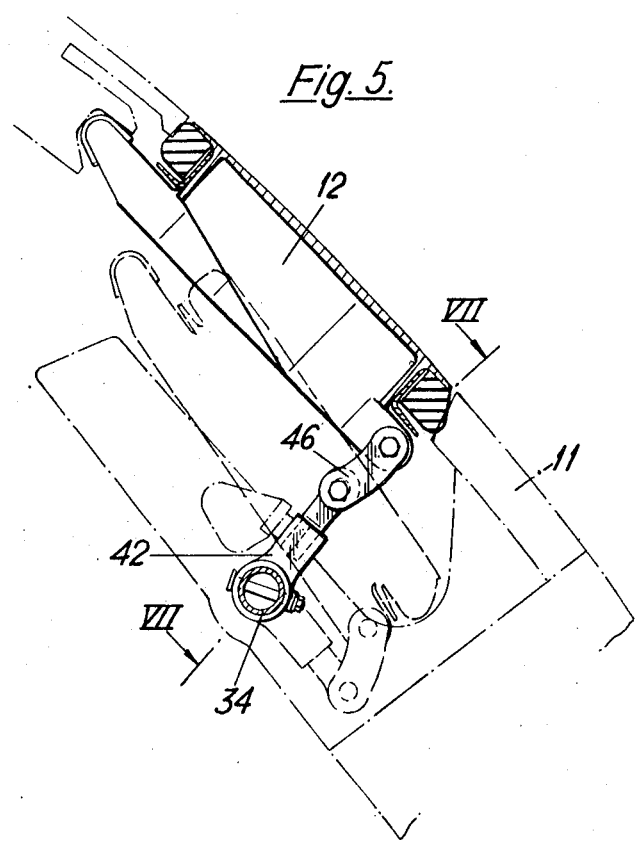
FIG. 5 is a sectioned view similar to FIG. 4 but taken as indicated by the arrows V—V seen in FIG. 1.
Figure 7:
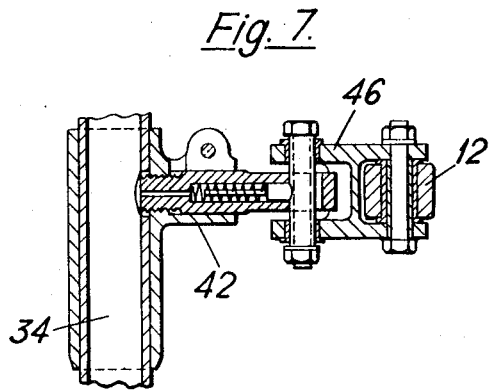
FIG. 7 is a fragmentary sectioned view taken as indicated by the arrows VII—VII seen in FIG. 5.
Figure 8:
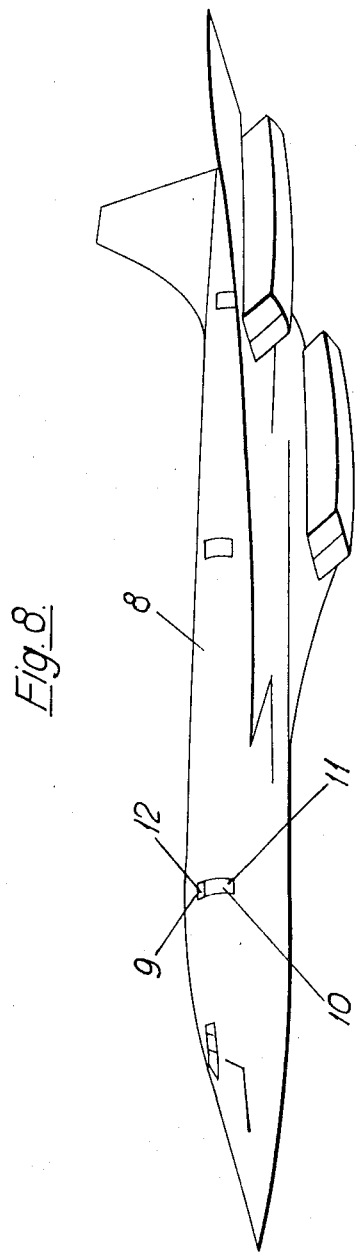
FIG. 8 is an elevation of the aircraft in flight.

When the whole panel moves generally upwards, lugs 61 on the top of the panel are received in a recess 64 (FIG. 4) in the adjacent part of the fuselage. At the same time, a seal 66 of compressible rubber seals tightly against the upper edge 65 of the door opening in the fuselage. This tight engagement of the upper part of the panel occurs before the handle 14 has been turned fully downwards. Further turning of the handle causes the lower part of the panel to be forcibly pressed outwards, being directed by the links 50 and 52 as seen in FIG. 4 and by the upper more outwardly directed part of the slot 60 seen in FIG 6. As the bottom part of the panel is being pressed home to be flush with the contour of the aircraft, the linkages 44 and 46 are moving over top dead center as is readily seen from FIG. 5. When the panel has been pressed out to be flush with the contour of the fuselage, the microswitch 56 cooperating with the portion 54 of the lever 50 engages to indicate to the cockpit the secure fastening of the panel.

In the fastened condition, any tendency for the door to move vertically is completely prevented by the fact that the main part 11 of the door is held positively down behind the lugs by the tight insertion of the panel 12 between the upper part of the door and the edge of the fuselage lying above it. The stability of the panel in that position is maintained by the over-dead-center position of the linkage 44 and 46. A further lock is present between the main part 11 and the panel 12, because the axis of the top pivots of the links 50 and 52 lies outboard of a plane passing through the bottom pivots of the links 50 and 52, and the recess 64 into which the panel lugs engage.

The movements which occur when the handle is raised from the lower to the upper position to open the door, are completely the sequential reverse of what has been described above. Firstly the linkages 44 and 46 are moved back over their top dead center, and the lower part of the panel 12 is moved inwards and downwards relatively to the upper part, to the position seen in broken line in FIG. 5. During the downward movement of the lower part, the upper part is able to move out of the cavity 64, being guided by the form of the slot 60.

As the panel is being lowered relative to the door, the door is moving upwards relative to the fuselage. It is therefore necessary to design the components so that the final downward displacement of the panel relative to the fuselage is greater than the final upward displacement of the door relative to the panel, otherwise the panel would foul the fuselage. This is because it is necessary that when the panel is fully retracted and the door fully raised, the panel should be clear of the fuselage so as to enable the door to be opened.

FIG. 4 shows in full line the fastened position of the panel, the edge 65 of the fuselage being seen in chain line, but the retracted position of the panel seen as 12a in broken line corresponds to the relative position of the edge of the fuselage shown in dotted line at 65a.

We claim:

1. An aircraft including a fuselage having a substantially rectangular doorway opening and a door assembly mounted to the fuselage and pivotable between open and closed positions with respect to the doorway opening, the door assembly comprising:
   a. a main part,
   b. first door-securing means disposed around the periphery of the main part,
   c. second door-securing means cooperable with the first such means and disposed around the doorway opening,
   d. a locking panel having a first edge remote from the main part and a second, opposite edge adjacent the main part,
   e. a recess in the fuselage along a horizontal edge of the doorway opening,
   f. toggle linkage means having a top dead center position operatively interconnecting the main part to the locking panel such that, in the door-closed position, the panel and main part lie vertically adjacent each other fitting tightly in the doorway opening and flush with the fuselage with the first and second door-securing means in cooperative engagement and the first edge of the panel tightly received in the recess,
   g. the toggle linkage means being movable through its top dead center position, when opening the door assembly, to first move the second edge of the panel inwardly of the fuselage and then move the panel vertically to lie over the main part and disengage the first edge from the recess, the main part with said panel then being liftable, and hingeable outwards relatively to said fuselage to open said doorway.

2. An aircraft according to claim 1 in which the toggle linkage means comprises two panel-operating levers which pivotally connect at their opposite ends to the panel and to the main part, and a roller carried by one of the panel and the main part, the roller moving along a slot in a member carried respectively by the other of the main part and the panel.

3. An aircraft according to claim 2 in which the slot is shaped so that during the closing of the door the upper edge of the panel is moved upwards and outward before the lower edge, the lower edge of the panel then being forced outwards by the panel-operating levers until the panel lies flush with the fuselage.

4. An aircraft according to claim 3 in which in the door-closed position, the pivotal connection between the panel and the panel-operating levers lies outboard of an imaginary plane passing through the first edge of the panel and through the pivotal connection between the operating levers and the main part.

5. An aircraft according to claim 2 in which the panel carries a torsion shaft lying horizontal and parallel to the panel, and rotatable about its own axis, the shaft carrying a radially projecting member which pivotally connects to a lever which further pivotally connects to a toggle linkage, which in turn connects to the panel, the linkage moving over dead center when the panel is forced upwards and outwards by rotation of the shaft, or during the reverse movement.

6. An aircraft according to claim 5 in which the door has an internal handle, there being a linkage connecting the handle to the torsion shaft so that movement of the handle causes the shaft to rotate and hence the panel to move from its one position to its other position.

7. An aircraft according to claim 6 in which the handle carries a further radially projecting member, and in which there is a compression spring mounted between that member and a point on the door spaced radially from the handle, the compression spring being compressed and then relaxed by movement of the handle from one end position to the other so that the compression spring holds the door in the raised or lowered position.

8. An aircraft according to claim 1 and which includes a further linkage which causes the main part of the door to rise to disengage the securing means as the panel is being retracted below the upper edge of the opening.

9. An aircraft according to claim 1 in which the fuselage carries a hinge having a vertical axis, the hinge supporting a bracket carrying a parallel linkage which has horizontal axes and which connects the door to the hinge, there being a tension spring between the bracket and the underlying part of the door, and the handle carried by the door connecting to the bracket by a link which moves vertically when the handle is operated to raise or lower the door, the weight being taken by the hinge and bracket through the spring.

10. An aircraft according to claim 1 in which the first fastening means are catches carried by the fuselage, and the second fastening means are lugs carried by the door.

* * * * *